United States Patent [19]

Mahurin

[11] Patent Number: 5,991,786
[45] Date of Patent: Nov. 23, 1999

[54] CIRCUIT AND METHOD FOR SHIFTING OR ROTATING OPERANDS OF MULTIPLE SIZE

[75] Inventor: Eric W. Mahurin, Austin, Tex.

[73] Assignee: Advanced Micro Devices, Inc., Sunnyvale, Calif.

[21] Appl. No.: 08/995,259

[22] Filed: Dec. 19, 1997

[51] Int. Cl.[6] ....................................................... G06F 7/00
[52] U.S. Cl. .............................................................. 708/209
[58] Field of Search .................................... 708/205, 208, 708/209; 377/64, 69, 70, 73, 75

[56] References Cited

U.S. PATENT DOCUMENTS

| | | | |
|---|---|---|---|
| 4,490,809 | 12/1984 | Ueda et al. | 377/73 |
| 4,631,703 | 12/1986 | Sakamoto | 377/64 |
| 4,831,571 | 5/1989 | Tokumaru | 708/209 |
| 4,839,839 | 6/1989 | Tokumaru et al. | 708/209 |
| 5,379,240 | 1/1995 | Byrne | 708/209 |
| 5,671,166 | 9/1997 | Omote | 708/209 |

*Primary Examiner*—Chuong Dinh Ngo
*Attorney, Agent, or Firm*—Conley, Rose & Tayon, P.C.; Eric A. Stephenson

[57] ABSTRACT

A circuit and method for shifting or rotating operands of multiple size is disclosed. The method and circuit employs at least one shifting stage configured to receive and selectively shift an operand, and a first circuit coupled to and configured to receive the result of the shifting stage. The first circuit operates in accordance with signals received at first and second control nodes. The first circuit operates as a shifter for shifting or passing the result of the shifting stage in response to the first and second control nodes receiving a first shift or second shift signal, respectively. The first circuit also operates to logically OR one set of m consecutive bits of the result received from the shifting stage with another set of m consecutive bits of the result received from the shifting stage, in response to the first and second control nodes receiving an OR signal.

25 Claims, 3 Drawing Sheets

CIRCUIT AND METHOD FOR SHIFTING OR ROTATING OPERANDS OF MULTIPLE SIZE

BACKGROUND OF THE INVENTION

1. Field of the Invention

This invention relates to shifters or rotators, and more particularly to a method and circuit for shifting or rotating operands of multiple size.

2. Description of the Relevant Art

Microprocessors determine the speed and power of personal computers, and a growing number of more powerful machines, by handling most of the data processing in the machine. Microprocessors typically include at least three functional groups: the input output unit (I/O), the control unit and the arithmetic logic unit (ALU). The I/O unit interfaces between external circuitry and the ALU and the control unit. I/O units frequently include signal buffers for increasing the current capacity of the signal before the signal is sent to external components. The control unit controls the operation of the microprocessor by fetching instructions from the I/O unit and translating the instructions into a form that can be understood by the ALU. In addition, the control unit keeps track of which step of the control unit is being executed. The ALU handles the mathematical computations and logical operations that are performed by the microprocessor. The ALU executes the decoded instructions received from the control unit to modify data contained in registers within the processor.

Essential components of any ALU include the operand shifter and operand rotator. The shifter generally operates to shift an operand left or right by x bits with zero fill. The rotator generally operates to rotate an operand left or right by x bits. Often times, the shifter and rotator are combined into a single shifter/rotator circuit in order to conserve the physical size of the ALU. Furthermore, the shifter/rotator can be constructed and operated to shift or rotate operands of multiple size to avoid employing several shifter/rotators each designated for use on operands of a single size.

FIG. 1 illustrates a prior art shifter/rotator 10 capable of shifting or rotating eight bit or four bit operands either left or right depending upon the control signals inputted thereto and how the shifter/rotator 10 is loaded. Generally, shifter/rotator 10 is a double left shifter configured to also right shift operands provided thereto as will be more fully explained below. Shifter/rotator 10 includes a pre-shift stage 12 which has two functions one of which is to pre-shift four bit operands so that they are properly aligned for a rotation operation. Shifter/rotator 10 also includes a first shifting stage 14 for shifting operands provided thereto by one bit, second shifting stage 16 for shifting operands provided thereto by two bits, and third shifting stage 18 for shifting operands provided thereto by four bits. Shifter/rotator 10 is arranged so that the first, second, and third shifting stages 14, 16, and 18, respectively, receive the result operand of the pre-shifting, first, and second shifting stages, respectively.

Shifter/rotator 10 further includes upper input nodes 20, lower input nodes 22, and output nodes 26. The eight output nodes 26 provide the results of shifting or rotating an eight bit operand, while the four least significant output nodes 26 provide the results of shifting or rotating a four bit operand.

As noted above, shifter/rotator 10 operates to shift or rotate four or eight bit operands depending upon the operands provided to input nodes 22 and 24. More specifically, a shift left of an eight bit operand is accomplished by providing the eight bit operand to be shifted to the upper input nodes 20 and logical zeros to each of the lower input nodes 22. A shift right of an eight bit operand is accomplished by providing a logical zero to each of the upper input nodes 20 and the eight bit operand to be shifted to the lower input nodes 22. Rotating an eight bit operand left or right is accomplished by providing the eight bit operand to both the upper and lower input nodes 20 and 22, respectively.

A shift left of a four bit operand is accomplished by providing the four bit operand to be shifted to the four least significant upper input nodes 20, a logical zero to each of the four most significant upper input nodes 20, and a logical zero to each of the lower input nodes 22. Shifting a four bit operand right is accomplished by providing a logical zero to each of the upper input nodes 20, a logical zero to each of the four most significant lower input nodes 22, and the four bit operand to be shifted to the four least significant lower input nodes 22. Rotating a four bit operand either left or right is accomplished by providing the four bit operand to be rotated to the four least significant upper and lower input nodes 20 and 22, respectively, and a logical zero to each of the four most significant upper and lower input nodes 20 and 22, respectively.

Pre-shift stage 12 is configured to receive a sixteen bit operand consisting of the concatenated bits provided to upper and lower input nodes 20 and 22. Pre-shift stage 12 includes a pair of shifting stages which operate to selectively shift the sixteen bit operand left by one and/or realign a four bit operand provided to the four least significant lower input nodes 22. One of the pair of shifting stages includes a first set of multiplexers 44 coupled to and controlled by a pre-shift control node 46. The other shifting stage includes a second set of multiplexers 50 coupled to and controlled by a right shift control node 52. Multiplexers 44 operate to selectively left shift the four bit operand provided to the four least significant lower input nodes 22 in accordance with a control signal provided to pre-shift control node 46. More specifically multiplexers 44 operate to pass either the four bit operand provided to the four least significant lower input nodes 22 when pre-shift control node 46 receives a logical one, or the four logical zeros provided to the four most significant lower input nodes 22 when pre-shift control node 46 receives a logical zero. In general, multiplexers 44 shift or align the four bit operand provided to shifter/rotator when shifter/rotator circuit 10 is employed to rotate a four operand left or right. Multiplexers 50 operate to selectively shift the sixteen bit operand, with or without realignment by multiplexers 44, left by one according to a control signal provided to right shift control node 52. More specifically, multiplexers 50 operate to pass either the fifteen least significant bits of the sixteen bit operand provided thereto when the right shift control node 52 receives a logical one, or the fifteen most significant bits of the sixteen bit operand provided thereto when the right shift control node 52 receives a logical zero. As will be described below, multiplexers 50 of pre-shift stage 12 operate to shift left by one when shifter/rotator 10 is employed to right shift or right rotate a four or eight bit operand.

First shifting stage 14 includes a plurality of two input multiplexers 30 coupled to and controlled by a first shift control node 32. First shifting stage 14 is configured to receive the fifteen bit result operand of pre-shift stage 12. First shift stage 14 operates to selectively shift the result operand left by one bit according to a control signal provided to the first shift control node 32. In other words, first shifting stage 14 operates to pass either the fourteen least significant bits of the fifteen bit result operand provided by pre-shift stage 12 when the first shift control node 32 receives a logical one, or the fourteen most significant bits of the fifteen bit result operand provided by pre-shift stage 12 when the first shift control node 32 receives a zero.

Second shifting stage 16 includes a plurality of two input multiplexers 34 coupled to and controlled by second shift control node 36. Second shifting stage 16 is configured to receive the fourteen bit result operand of the first shifting stage 14. Second shifting stage 16 operates to selectively shift the result operand left by two bits in accordance with a control signal provided to second shift control node 36. In other words, second shifting stage 14 operates to pass either the twelve least significant bits of the fourteen bit result operand provided by first shifting stage 14 when the second shift control node 36 receives a logical one, or the twelve most significant bits of the fourteen bit result operand provided by first shifting stage 14 when the second shift control node 36 receives a logical zero.

Third shifting stage 18 comprises a plurality of two input multiplexers 40 coupled to and controlled by a third shift control node 42. Third shift control node 42 is configured to receive the twelve bit result operand provided by second shifting stage 16. Third shifting stage 18 operates to selectively shift the result operand left by four bits in accordance with a control signal provided to third shift control node 42. In other words, third shifting stage 16 operates to pass either the eight least significant bits of the twelve bit result operand provided by second shifting stage 16 when the third shift control node 42 receives a logical one, or the eight most significant bits of the twelve bit result operand provided by second shifting stage 16 when the third shift control node 42 receives a logical zero.

As noted above, shifter/rotator is a double left shifter which can right shift operands in addition to left shifting operands. Shifter/rotator can also rotate operands left or right. One of ordinary skill in the art will recognize that shifting or rotating an operand right by a designated shift count using a double left shifter is equivalent to shifting or rotating the same operand by the negative of the shift count. Further, one of ordinary skill in the art will recognize that in two's compliment notation, the negative of the shift count equates to the complemented shift count and binary one. Rather than employing a separate circuit to calculate the negative shift count in order to achieve a right shift or a right rotate, the shifter/rotator circuit 10 achieves right shift or a right rotate simply by complementing the shift input provided to control nodes 32, 36 and 42, and by asserting logical one to the right shift control node 52.

As noted above, each shifting stage 12–18 is controlled by corresponding control nodes 32, 36, 42, 46, and 52. Control nodes 32, 36, and 42 receive a shift count provided by an instruction to shift or rotate an operand. Control nodes 52 and 46 receive control signals associated with instructions for right shifting four or eight bit operands and/or rotating four bit operands. For example, when an eight bit operand is to be shifted or rotated left by five bits, control nodes 32, and 42 receive a logical one while control nodes 36, 52 and 46 receive a logical zero. When a four bit operand is to be shifted left by three bits, control nodes 32 and 36 receive a logical one while control node 42, 52 and 46 receive a logical zero. When a four bit operand is to be rotated left by three bits, control nodes 32, 46 and 36 receive a logical one while control node 42 and 52 receive a logical zero.

As can be appreciated, pre-shift stage 12 complicates the design and operation of shifter/rotator 10. More particularly, pre-shift stage 12 is complicated by the presence of the first set of multiplexers 44 coupled to and controlled by the pre-shift control node 46. Shifter/rotator 10 would require an even more complicated pre-shifting stage 12 if shifter/rotator 10 were configured to shift four, eight or sixteen bit operands.

From an inspection of FIG. 1 and the description relating thereto above, it is apparent that operation and implementation of shifter/rotator 10 can be simplified if the first set of multiplexers 44 within pre-shift stage 12 can be eliminated. This would have the effect of reducing the size of the shifter/rotator 10 in addition to increasing its speed of operation.

SUMMARY OF THE INVENTION

The problems identified above are in large part solved by a method and circuit for shifting or rotating operands of multiple size. In one embodiment, the method and circuit employs at least one shifting stage configured to receive and selectively shift an operand, and a first circuit coupled to and configured to receive the result of the shifting stage. The first circuit operates in accordance with signals received at first and second control nodes. The first circuit operates as a shifter for shifting or passing the result of the shifting stage in response to the first and second control nodes receiving a first shift or second shift signal, respectively. The first circuit also operates to logically OR one set of m consecutive bits of the result received from the shifting stage with another set of m consecutive bits of the result received from the shifting stage, in response to the first and second control nodes receiving an OR signal.

In one embodiment, the first circuit includes m pairs of AND gates and m OR gates. Each AND gate in a pair is coupled respectively to a pair of inputs of one of the OR gates. One input of each of the pairs of AND gates is coupled to the first and second control nodes, respectively. The other input of each pair of AND gates is coupled to receive selective bits of the result of the shifting stage.

One advantage of the present invention is that it eliminates complex pre-shifting stages of the prior art.

Another advantage of the present invention is that it eliminates complex operand alignment of the prior art needed to properly rotate an operand.

BRIEF DESCRIPTION OF THE DRAWINGS

Other objects and advantages of the invention will become apparent upon reading the following detailed description and upon reference to the accompanying drawings in which.

Figure 1:
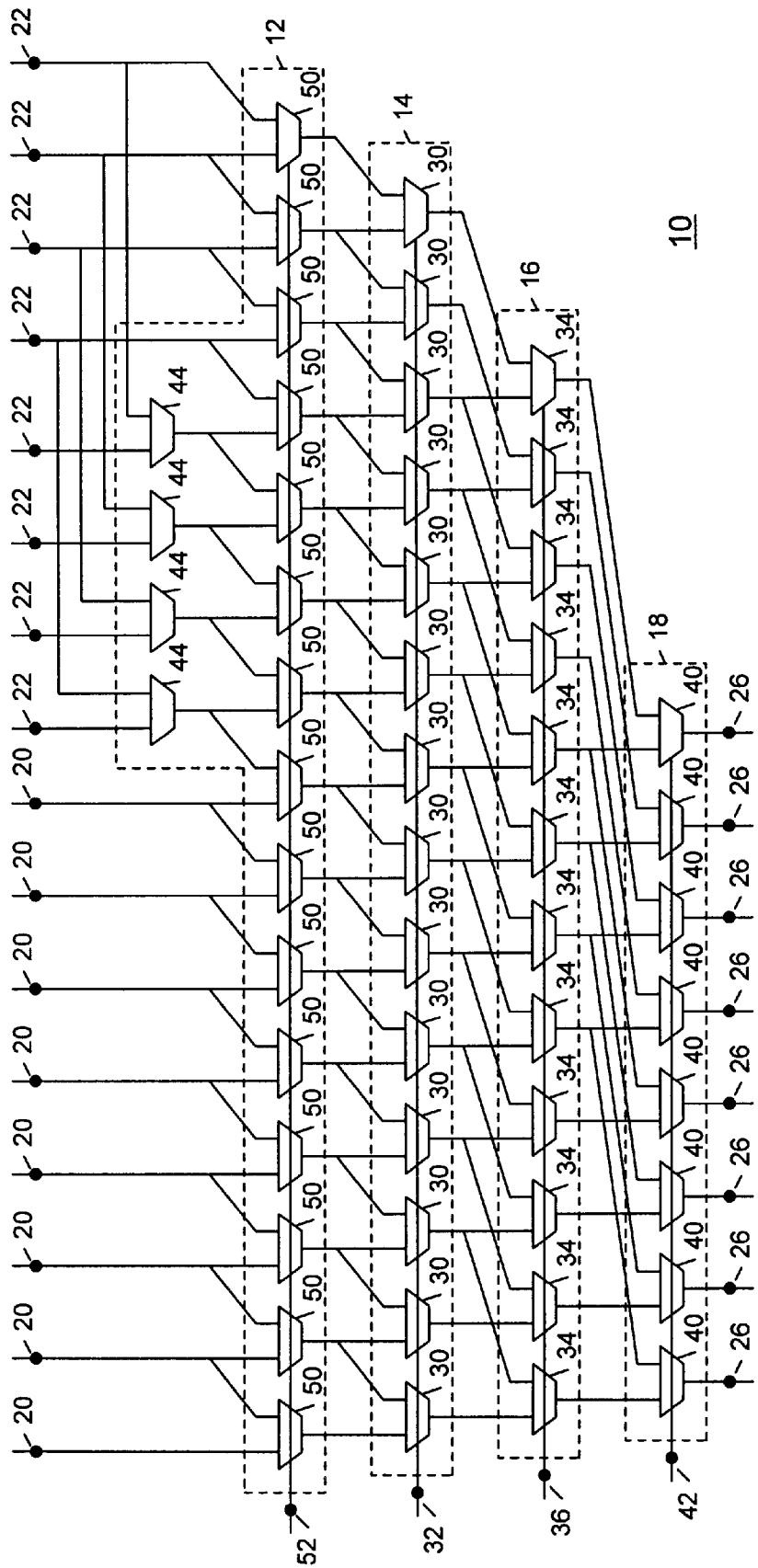
FIG. 1 is a schematic of a prior art shifter/rotator.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
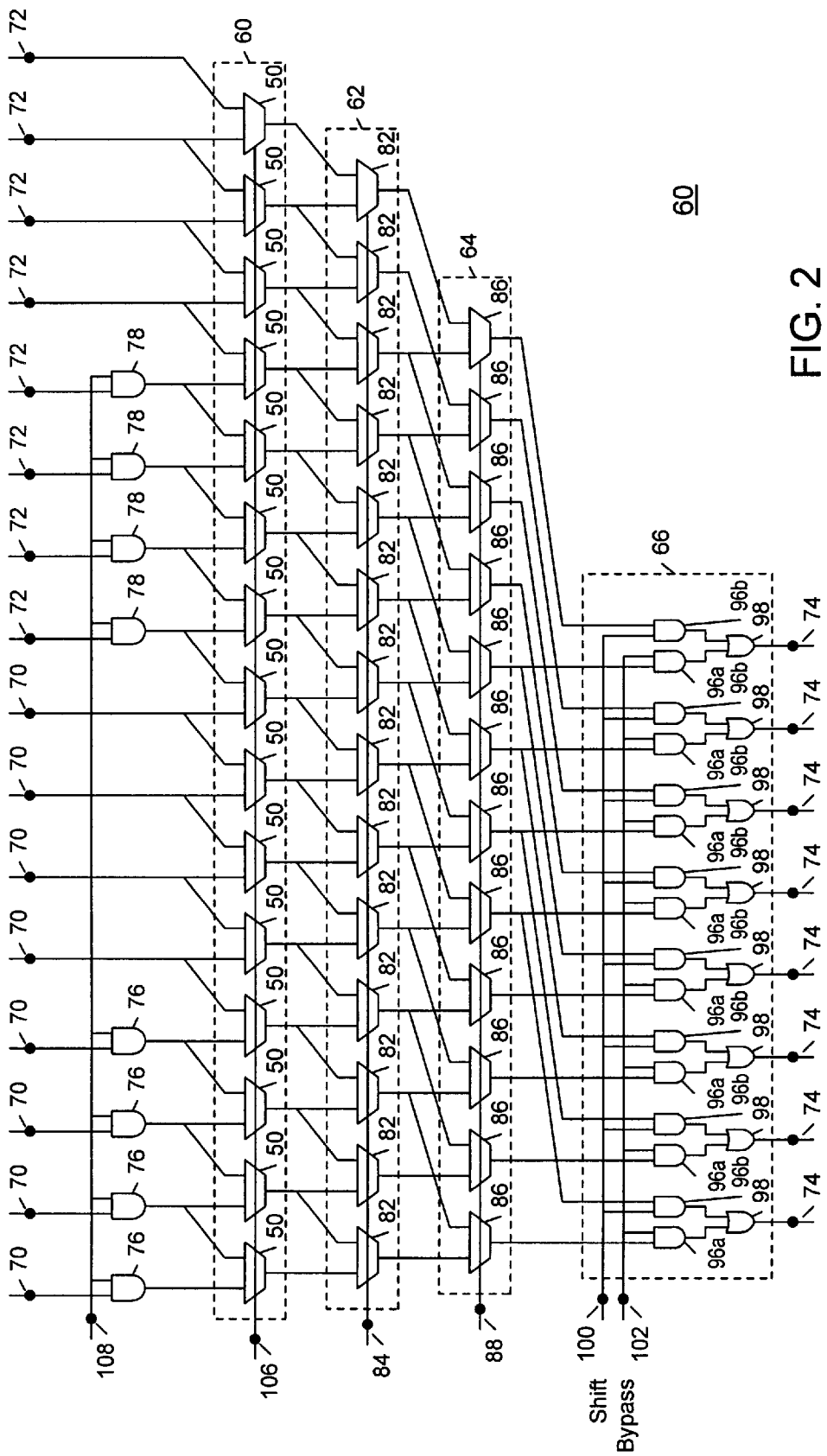
FIG. 2 is a schematic diagram of a shifter/rotator employing the present invention.

FIG. 2 is a schematic diagram of one embodiment of a shifter/rotator 60 employing the present invention. Description of the present invention will be made with respect to shifter/rotator 60 configured to shift or rotate four or eight bit operands either left or right. However, the present invention should not be limited thereto. More particularly, the present invention has broader applications including use within a shifter, a rotator, or a shifter/rotator which can shift operands with sizes other than four and/or eight bits.

Shifter/rotator 60 includes a first shifting stage 62, a second shifting stage 64, a circuit 66, and a pre-shifting stage 68. Shifter/rotator 60 further includes upper and lower input nodes 70 and 72, respectively, output nodes 74, and two sets of AND gates 76 and 78. Shifter/rotator 60 is configured to shift or rotate four bit or eight bit operands either left or right depending upon control signals provided to shifter/rotator 60 and upon operand loading of upper and lower input nodes 70 and 72.

The first set of AND gates 76 are coupled between the four most significant upper input nodes 70 and pre-shifting stage 68. The second set of AND gates 74 are coupled between the four most significant lower input nodes 72 and pre-shifting stage 68. Upper and lower input nodes 70 and 72 are configured to receive four or eight bit operands to be shifted or rotated. First and second sets of AND gates 76 and 74 are coupled to an eight bit control node 108 and operate to pass or clear to logical zero the four most significant bits provided to the upper and lower input nodes 70 and 72 in response to a logical zero or one provided to eight bit control node 108. A zero is provided to node 108 when shifter/rotator 60 operates to shift or rotate four bit operands. A logical one is provided to node 108 when the shifter/rotator 60 operates to shift or rotate eight bit operands. It is noted that AND gates 76 and 74 are redundant if a logical zero is provided to each of the four most significant upper and/or lower input nodes 70 and 72 when rotating or shifting a four bit operand.

First shifting stage 62 includes plurality of two input multiplexers 82 coupled to and controlled by first stage control node 84. First shifting stage 62 operates to selectively shift left by one bit the fifteen bit result operand provided by pre-shifting stage 68. More particularly, when first stage control node 84 receives a logical one, first shifting stage 62 operates to pass the fourteen most significant bits of the fifteen bit result operand provided by pre-shifting stage 68. In response to first stage control node 84 receiving a logical zero, first shifting stage 62 operates to pass the fourteen most significant bits of the fifteen bit result operand provided by pre-shifting stage 68.

Second shifting stage 64 includes a plurality of two input multiplexers 86 coupled to and controlled by second stage control node 88. Second shifting stage 64 operates to selectively shift left by two the fourteen bit result operand provided by first shifting stage 62. More particularly, in response to second stage control node 88 receiving a logical one, second shifting stage 64 operates to pass the twelve least significant bits of the fourteen bit result operand provided by first shifting stage 62. In response to the second stage control node 88 receiving a logical zero, second shifting stage 64 operates to pass the twelve most significant bits of the fourteen bit result operand provided by first shifting stage 62.

Circuit 66 is configured to receive the twelve bit operand result provided by second shifting stage 64. Circuit 66 is coupled to and controlled by shift and bypass control nodes 100 and 102. Circuit 66 operates to selectively shift or logically OR the twelve bit result operand provided by second shifting stage 64. With regard to selectively shifting the result operand of shifting stage 64, circuit 66 passes the eight most significant bits of the twelve bit result operand in response to shift and bypass control nodes receiving a pass signal, i.e., a logical zero provided to the shift control node 100 and a logical one provided to the bypass control node 102. Circuit 66 operates to pass the eight least significant bits of the twelve bit result operand in response to receiving a shift control signal, i.e., the shift control node 100 receiving a logical one and bypass control node 102 receiving a logical zero. With regard to logically ORing the result operand, circuit 66 operates to logically OR the eight most significant bits with the eight least significant bits, receptively, of the twelve bit result operand provided by the second shifting stage 64 in response to receiving an OR signal, i.e., shift and bypass control nodes receiving a logical one signal.

Circuit 66, in one embodiment, comprises a plurality of logic blocks. Each logic block includes a pair of AND gates 96*a* and 96*b* coupled to an OR gate 98. Each of the AND gates 96*a* and 96*b* has an output coupled to one input of OR gate 98. The output of OR gate 98 is coupled to a respective output node 74. Each AND gate 96*a* has a pair of inputs one of which is coupled to second node 102, the other of which is coupled to receive a selected bit from the twelve bit result operand provided by second shifting stage 64. Each AND circuit 96*b* has a pair of inputs one of which is coupled to first control node 100, the other of which is coupled to receive a selected bit from the operand result provided by second shifting stage 64.

Circuit 66 operates to selectively shift the twelve bit result operand provided by second shifting stage 64, for example, when shifter/rotator 60 is employed to shift or rotate eight bit operands. Circuit 66 operates to OR selected bits of the operand resulting from second stage 64 when shifter/rotator 60 operates to rotate a four bit operand left or right. The ORing function provided by circuit 66 results from the observation that in the prior art shown in FIG. 1, third shifting stage 18 is redundant for selectively shifting left by four bits the results of the second shifting stage 16 in a four bit operand shift or rotate function. In other words, rotating a four bit operand either left or right by four bits does not result in a different operand.

Pre-shift stage 68 comprises a plurality of two input multiplexers 50 coupled to and controlled by a right control input node 106. Pre-shift stage 68 is coupled to receive sixteen bits representing the four or eight bit operand to be shifted or rotated concatenated with a copy thereof or logical zeros. The sixteen bit operand is provided by the upper and lower input nodes 70 and 72 and the first and second AND gates 76 and 74. Pre-shift stage 68 operates to selectively shift left by one the sixteen bit operand provided thereto. When right control node 106 receives a logical one, pre-shifting stage 12 operates to pass the fifteen least significant bits of the sixteen bit input. When right control input node 106 receives a logical zero, pre-shifting stage 68 operates to pass the fifteen most significant bits of the sixteen bit input operand. A logical one is provided to right shift control input node 106 when shifter/rotator 10 operates to right shift or right rotate either four bit or eight bit operand. Pre-shifting stage is employed in shifter/rotator 60 to add an extra one bit left shift in accordance with the well known principle that right shifting or rotating an operand by a shift count is equal to left shifting the operand by a negative of the shift count, and that the negative of the shift count equals the two's complement of the shift count, i.e., the complement of the shift count added to binary one. Rather than generating a new shift count by adding binary one to the complemented shift count, pre-shifting circuit 68 shifts its input by one in right shift or rotate operations.

Shifter/rotator 60 shifts or rotates four bit or eight bit operands either left or right according to values provided to control nodes 84, 88, 100, 102, and 106.

Shifter/rotator 60 can operate to left shift an eight bit operand by first loading the eight bit operand into the upper input nodes 70 and inputting a logical zero into each of the lower input nodes 72. Thereafter, appropriate control signals including a shift count are provided to the various control nodes. Table 1 below shows various settings for the control nodes for left shifting the eight bit operand.

TABLE 1

| Node | \multicolumn{8}{c}{Shift Count} |
|------|---|---|---|---|---|---|---|---|
|      | 7 | 6 | 5 | 4 | 3 | 2 | 1 | 0 |
| 8 bit (108) | 1 | 1 | 1 | 1 | 1 | 1 | 1 | 1 |
| shift (100) | 1 | 1 | 1 | 1 | 0 | 0 | 0 | 0 |
| bypass (102) | 0 | 0 | 0 | 0 | 1 | 1 | 1 | 1 |
| rt. Shift (106) | 0 | 0 | 0 | 0 | 0 | 0 | 0 | 0 |
| $1^{st}$ shift (84) | 1 | 0 | 1 | 0 | 1 | 0 | 1 | 0 |
| $2^{nd}$ shift (88) | 1 | 1 | 0 | 0 | 1 | 1 | 0 | 0 |

Upon completion, shifter/rotator 60 provides at output nodes 74 a left shifted eight bit operand.

Shifter/rotator 60 can right shift an eight bit operand by first loading the eight bit operand into the lower input nodes 72 and by inputting a logical zero into each of the upper input nodes 70. Thereafter, appropriate control signals including the shift count are provided to the control nodes. Table 2 below shows the various signals to be provided to the control nodes needed to right shift the eight bit operand according to a particular shift count.

TABLE 2

| Node | \multicolumn{8}{c}{Shift Count} |
|------|---|---|---|---|---|---|---|---|
|      | 7 | 6 | 5 | 4 | 3 | 2 | 1 | 0 |
| 8 bit (108) | 1 | 1 | 1 | 1 | 1 | 1 | 1 | 1 |
| shift (100) | 0 | 0 | 0 | 0 | 1 | 1 | 1 | 1 |
| bypass (102) | 1 | 1 | 1 | 1 | 0 | 0 | 0 | 0 |
| rt shift (106) | 1 | 1 | 1 | 1 | 1 | 1 | 1 | 1 |
| $1^{st}$ shift (84) | 0 | 1 | 0 | 1 | 0 | 1 | 0 | 1 |
| $2^{nd}$ shift (88) | 0 | 0 | 1 | 1 | 0 | 0 | 1 | 1 |

Upon completion, shifter/rotator 60 outputs the right shifted eight bit operand at output nodes 78.

Shifter/rotator 60 can rotate an eight bit operand left or right by first inputting the eight bit operand into both the upper and lower input nodes 70 and 72 and by inputting the appropriate control signals into the control nodes. Tables 3 and 4 below show the control signals required to be inputted to the control nodes in order to rotate the eight bit operand left or right by a particular shift count.

TABLE 3

| Node | \multicolumn{8}{c}{Shift Count} |
|------|---|---|---|---|---|---|---|---|
|      | 7 | 6 | 5 | 4 | 3 | 2 | 1 | 0 |
| 8 bit (108) | 1 | 1 | 1 | 1 | 1 | 1 | 1 | 1 |
| shift (100) | 1 | 1 | 1 | 1 | 0 | 0 | 0 | 0 |
| bypass (102) | 0 | 0 | 0 | 0 | 1 | 1 | 1 | 1 |
| rt. shift (106) | 0 | 0 | 0 | 0 | 0 | 0 | 0 | 0 |
| $1^{st}$ shift (84) | 1 | 0 | 1 | 0 | 1 | 0 | 1 | 0 |
| $2^{nd}$ shift (88) | 1 | 1 | 0 | 0 | 1 | 1 | 0 | 0 |

TABLE 4

| Node | \multicolumn{8}{c}{Shift Count} |
|------|---|---|---|---|---|---|---|---|
|      | 7 | 6 | 5 | 4 | 3 | 2 | 1 | 0 |
| 8 bit (108) | 1 | 1 | 1 | 1 | 1 | 1 | 1 | 1 |
| shift (100) | 0 | 0 | 0 | 0 | 1 | 1 | 1 | 1 |
| bypass (102) | 1 | 1 | 1 | 1 | 0 | 0 | 0 | 0 |
| rt. shift (106) | 1 | 1 | 1 | 1 | 1 | 1 | 1 | 1 |
| $1^{st}$ shift (84) | 0 | 1 | 0 | 1 | 0 | 1 | 0 | 1 |
| $2^{nd}$ shift (88) | 0 | 0 | 1 | 1 | 0 | 0 | 1 | 1 |

Upon completion, shifter/rotator 60 output the eight bit operand rotated left or right at the output nodes 74.

Shifter/rotator 60 can shift a four bit operand left by a shift count by first inputting the four bit operand into the four least significant upper input nodes 70 and by inputting a logical zero into each of the four least significant lower input nodes 72. Thereafter, appropriate signals are provided to the control nodes. Table 5 below shows the appropriate control signals needed to achieve the various shift counts.

TABLE 5

| Shift Count | 3 | 2 | 1 | 0 |
|---|---|---|---|---|
| Node |   |   |   |   |
| 8 bit (108) | 0 | 0 | 0 | 0 |
| shift (100) | 0 | 0 | 0 | 0 |
| bypass (102) | 1 | 1 | 1 | 1 |
| rt. shift (106) | 0 | 0 | 0 | 0 |
| 1st shift (84) | 1 | 0 | 1 | 0 |
| 2nd shift (88) | 1 | 1 | 0 | 0 |

Upon shifting the four bit operand left, shifter/rotator 60 provides the result at the four least significant output bits 74.

Shifter/rotator 60 can shift a four bit operand right by first inputting the four bit operand into the four least significant lower input nodes 72 and by inputting a logical zero to each of the four least significant upper input nodes 70. Thereafter, appropriate control signals are provided to the various control nodes. Table 6 below shows the various settings for the control nodes needed to shift the four bit operand right by the corresponding shift count.

TABLE 6

| Shift Count | 3 | 2 | 1 | 0 |
|---|---|---|---|---|
| Node |  |  |  |  |
| 8 bit (108) | 0 | 0 | 0 | 0 |
| shift (100) | 0 | 0 | 0 | 0 |
| bypass (102) | 1 | 1 | 1 | 1 |
| rt. shift (106) | 1 | 1 | 1 | 1 |
| 1st shift (84) | 0 | 1 | 0 | 1 |
| 2nd shift (88) | 0 | 0 | 1 | 1 |

Upon shifting the four bit operand right, shifter/rotator 60 outputs the results on the four least significant output nodes 74.

Shifter/rotator 60 can rotate a four bit operand either left or right by first loading the four bit operand into the four least significant upper and lower input nodes 70 and 72. Thereafter, the four bit operand is rotated left or right by a shift count when the appropriate control signals are provided to the control nodes. Tables 7 and 8 below indicate the control signals to be inputted to the various control nodes to achieve left and right rotation of the four bit operand according to the various shift counts.

TABLE 7

| Shift Count | 3 | 2 | 1 | 0 |
|---|---|---|---|---|
| Node |  |  |  |  |
| 8 bit (108) | 0 | 0 | 0 | 0 |
| shift (100) | 1 | 1 | 1 | 1 |
| bypass (102) | 1 | 1 | 1 | 1 |
| rt. shift (106) | 0 | 0 | 0 | 0 |
| 1st shift (84) | 1 | 0 | 1 | 0 |
| 2nd shift (88) | 1 | 1 | 0 | 0 |

TABLE 8

| Shift Count | 3 | 2 | 1 | 0 |
|---|---|---|---|---|
| Node |  |  |  |  |
| 8 bit (108) | 0 | 0 | 0 | 0 |
| shift (100) | 1 | 1 | 1 | 1 |
| bypass (102) | 1 | 1 | 1 | 1 |
| rt. shift (106) | 1 | 1 | 1 | 1 |
| 1st shift (84) | 0 | 1 | 0 | 1 |
| 2nd shift (88) | 0 | 0 | 1 | 1 |

Upon completion of the four bit rotation either left or right, shifter/rotator 60 provides the results at four least significant output nodes 74.

Figure 3:
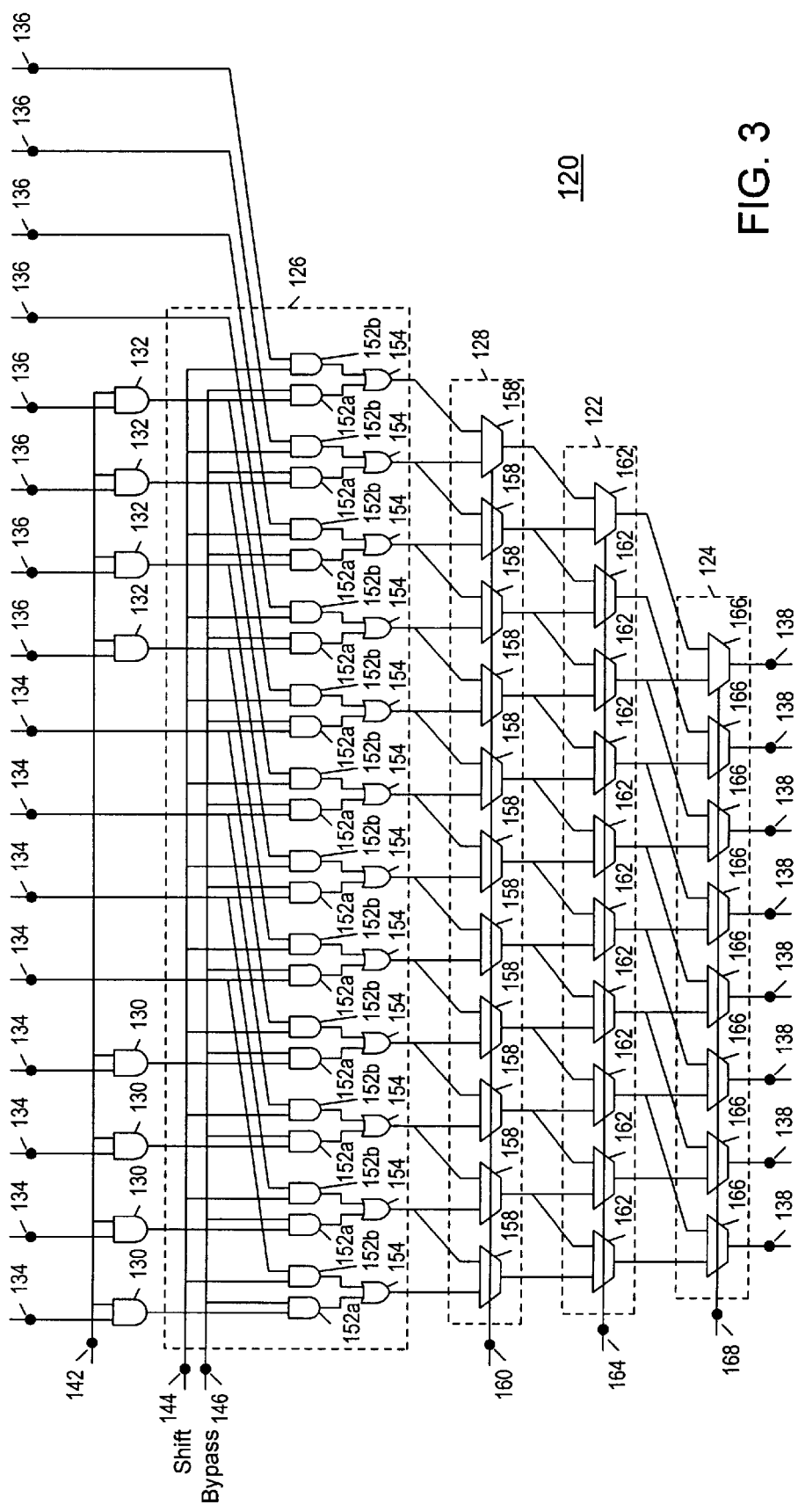
FIG. 3 is a schematic diagram of a shifter/rotator employing the present invention.

FIG. 3 shows an alternative embodiment of a shifting/rotating circuit employing the present invention. More specifically, FIG. 3 shows a shifter/rotator 120 including a first shifting stage 122, a second shifting stage 124 and circuit 126. Shifter/rotator 120 further includes a pre-shifting stage 128, a first set of AND gates 130, a second set of AND gates 132, upper input nodes 134, lower input nodes 136 and output nodes 138.

The first set of AND gates 130 are coupled between the four most significant upper input nodes 134 and circuit 126. The second set of AND gates 132 are coupled between the four most significant lower input nodes 136 and circuit 126. Upper and lower input nodes 134 and 136 are configured to receive four or eight bit operands to be shifted or rotated. First and second sets of AND gates 130 and 132 are coupled to an eight bit control node 142 and operate to pass or clear to zero the four most significant bits provided to the upper and lower input nodes 134 and 136 in response to a logical zero or one provided to control node 142. It is noted that AND gates 130 and 132 are redundant if a logical zero is provided to each of the four most significant upper and/or lower input nodes 134 and 136 when shifting or rotating a four bit operand.

Circuit 126 is coupled to and controlled by shift and bypass control nodes 144 and 146. Circuit 126 is configured to receive sixteen bits representing the operand, to be shifted or rotated, concatenated with a copy thereof or a second operand of all logical zeros. The sixteen bit operand is provided from the upper and lower input nodes 134 and 136 and the first and second AND gates 134 and 136. Circuit 126 operates to pass the twelve most significant bits of the sixteen bits inputted thereto in response to a pass signal provided to the shift and bypass control nodes 144 and 146. More specifically, circuit 126 operates to pass the twelve most significant bits in response to a logical zero provided to the shift control node 144 and a logical one provided to the bypass control node 146. Circuit 126 operates to shift the twelve least significant bits of the sixteen bits inputted thereto left by four bits in response to the shift and bypass control nodes receiving a shift signal. More particularly, circuit 126 operates to shift the least significant twelve bits left by four when shift control node 144 receives a logical one and bypass control node 146 receives a logical zero. Circuit 126 operates to logically OR the twelve most significant bits with the twelve least significant bits of bits inputted thereto in response to shift and bypass control nodes receiving a logical OR signal. More specifically, circuit 126 operates to logically OR the selected bits in response to the shift control node and bypass control node receiving logical ones.

In one embodiment, circuit 126 consists of a plurality of logic blocks each of which comprises a pair of AND gates 152*a* and 152*b* coupled to OR gate 154. AND gate 152*a* has an output coupled to a first input of OR gate 154, and a pair of inputs. One input of AND gate 152*a* is configured to receive one of the sixteen bits provided to circuit 126, while the other input of AND gate 152*a* is coupled to bypass control node 146. AND gate 152*b* has an output coupled to a second input of OR gate 154, and a pair of inputs. One input of AND gate 152*b* is coupled to shift control node 144 while the other input is configured to receive one of the sixteen bits inputted to circuit 12.

Pre-shifting circuit 128 is configured to receive the twelve bit result operand from circuit 126. Pre-shifting circuit 128 includes a plurality of two input multiplexers 158 coupled to and controlled by right shift control node 160. In response to right shift control node 160 receiving a logical one, pre-shifting stage 128 operates to shift left by one bit the eleven least significant bits of the twelve bit result operand provided by circuit 126. When right shift control node 160 receives a logical zero, pre-shifting stage 128 operates to pass the eleven most significant bits of the twelve bit result operand provided by circuit 126.

First shifting stage 122 comprises a plurality of two input multiplexers 162 coupled to and controlled by first shift control node 164. First shifting stage 122 is configured to receive the eleven bit result operand provided by pre-shifting stage 128. In response to first shift control node receiving a logical one, first shifting stage 122 operates to shift left by one the ten least significant bits of the eleven bit result operand provided by pre-shifting stage 128. In response to first shift control node receiving a logical zero, first shifting stage 122 operates to pass the ten most significant bits of the eleven bit result operand provided by pre-shifting stage 128.

Second shifting stage 124 comprises a plurality of two input multiplexers 166 coupled to and controlled by a second shift control node 168. A second shifting stage 124 is configured to receive the ten bit result operand provided by first shifting stage 122. In response to second shift control node 168 receiving a logical one, second shifting stage 124 operates to pass the eight least significant bits of the ten bit result operand provided by first shifting stage 122. In response to second shift control node 168 receiving a logical zero, second shifting stage 124 operates to pass the eight most significant bits of the ten bit result provided by the first shifting stage 122.

Shifter/rotator 120 operates to shift or rotate either four bit or eight bit operands, left or right, depending upon the inputs to upper and lower input nodes 134 and 136, and the inputs to control nodes 142, 144, 146, 160, 164 and 168.

Shifter/rotator 120 operates to left shift an eight bit operand by first loading the eight bit operand into the upper input nodes 134 and inputting a logical zero into each of the lower input nodes 136. Thereafter, appropriate control signals including a shift count are provided to the various control nodes. Table 9 below shows various settings for the control nodes for left shifting the eight bit operand.

TABLE 9

| | Shift Count | | | | | | | |
|---|---|---|---|---|---|---|---|---|
| Node | 7 | 6 | 5 | 4 | 3 | 2 | 1 | 0 |
| 8 bit (142) | 1 | 1 | 1 | 1 | 1 | 1 | 1 | 1 |
| shift (144) | 1 | 1 | 1 | 1 | 0 | 0 | 0 | 0 |
| bypass (146) | 0 | 0 | 0 | 0 | 1 | 1 | 1 | 1 |
| rt. Shift (160) | 0 | 0 | 0 | 0 | 0 | 0 | 0 | 0 |
| 1$^{st}$ shift (164) | 1 | 0 | 1 | 0 | 1 | 0 | 1 | 0 |
| 2$^{nd}$ shift (168) | 1 | 1 | 0 | 0 | 1 | 1 | 0 | 0 |

Upon completion, shifter/rotator 120 provides at output nodes 138 a left shifted eight bit operand.

Shifter/rotator 120 can right shift an eight bit operand by first loading the eight bit operand into the lower input nodes 136 and by inputting a logical zero into each of the upper input nodes 134. Thereafter, the appropriate signals including the shift count are provided to the control nodes. Table 10 below shows the various signals to be provided to the control nodes needed to right shift the eight bit operand according to a particular shift count.

TABLE 10

| | Shift Count | | | | | | | |
|---|---|---|---|---|---|---|---|---|
| Node | 7 | 6 | 5 | 4 | 3 | 2 | 1 | 0 |
| 8 bit (142) | 1 | 1 | 1 | 1 | 1 | 1 | 1 | 1 |
| shift (144) | 0 | 0 | 0 | 0 | 1 | 1 | 1 | 1 |
| bypass (146) | 1 | 1 | 1 | 1 | 0 | 0 | 0 | 0 |
| rt. shift (160) | 1 | 1 | 1 | 1 | 1 | 1 | 1 | 1 |
| 1$^{st}$ shift (164) | 0 | 1 | 0 | 1 | 0 | 1 | 0 | 1 |
| 2$^{nd}$ shift (168) | 0 | 0 | 1 | 1 | 0 | 0 | 1 | 1 |

Upon completion, shifter/rotator 120 outputs the right shifted eight bit operand at output nodes 138.

Shifter/rotator 120 can rotate an eight bit operand left or right by first inputting the eight bit operand into both the upper and lower input nodes 134 and 136 and by inputting the appropriate control signals into the control nodes. Tables 11 and 12 below show the control signals required to be inputted to the control nodes in order to rotate the eight bit operand by a particular shift count.

TABLE 11

| | Shift Count | | | | | | | |
|---|---|---|---|---|---|---|---|---|
| Node | 7 | 6 | 5 | 4 | 3 | 2 | 1 | 0 |
| 8 bit (142) | 1 | 1 | 1 | 1 | 1 | 1 | 1 | 1 |
| shift (144) | 1 | 1 | 1 | 1 | 0 | 0 | 0 | 0 |
| bypass (146) | 0 | 0 | 0 | 0 | 1 | 1 | 1 | 1 |
| rt. shift (160) | 0 | 0 | 0 | 0 | 0 | 0 | 0 | 0 |
| 1$^{st}$ shift (164) | 1 | 0 | 1 | 0 | 1 | 0 | 1 | 0 |
| 2$^{nd}$ shift (168) | 1 | 1 | 0 | 0 | 1 | 1 | 0 | 0 |

TABLE 12

| | Shift Count | | | | | | | |
|---|---|---|---|---|---|---|---|---|
| Node | 7 | 6 | 5 | 4 | 3 | 2 | 1 | 0 |
| 8 bit (142) | 1 | 1 | 1 | 1 | 1 | 1 | 1 | 1 |
| shift (144) | 0 | 0 | 0 | 0 | 1 | 1 | 1 | 1 |
| bypass (146) | 1 | 1 | 1 | 1 | 0 | 0 | 0 | 0 |
| rt. shift (160) | 1 | 1 | 1 | 1 | 1 | 1 | 1 | 1 |
| 1$^{st}$ shift (164) | 0 | 1 | 0 | 1 | 0 | 1 | 0 | 1 |
| 2$^{nd}$ shift (168) | 0 | 0 | 1 | 1 | 0 | 0 | 1 | 1 |

Upon completion, shifter/rotator 120 output the eight bit operand rotated left or right at the output nodes 138.

Shifter/rotator 120 can shift a four bit operand left by a shift count by first inputting the four bit operand into the four least significant upper input nodes 134 and by inputting a logical zero into each of the lower input nodes 136. Thereafter, appropriate signals are provided to the control nodes. Table 13 below shows the appropriate control signals needed to achieve the various shift counts.

TABLE 13

| Shift Count | 3 | 2 | 1 | 0 |
|---|---|---|---|---|
| Node |  |  |  |  |
| 8 bit (142) | 0 | 0 | 0 | 0 |
| shift (144) | 0 | 0 | 0 | 0 |
| bypass (146) | 1 | 1 | 1 | 1 |
| rt. shift (160) | 0 | 0 | 0 | 0 |
| 1st shift (164) | 1 | 0 | 1 | 0 |
| 2nd shift (168) | 1 | 1 | 0 | 0 |

Upon shifting the four bit operand left, shifter/rotator 120 provides the result at the four least significant output bits 138.

Shifter/rotator 120 can shift a four bit operand right by first inputting the four bit operand into the four least significant lower input nodes 136 and by inputting a logical zero to each of the four least significant upper input nodes 134. Thereafter, appropriate control signals are provided to the various control nodes. Table 14 below shows the various settings for the control nodes needed to shift the four bit operand right by the corresponding shift count.

TABLE 14

| Shift Count | 3 | 2 | 1 | 0 |
|---|---|---|---|---|
| Node |  |  |  |  |
| 8 bit (142) | 0 | 0 | 0 | 0 |
| shift (144) | 0 | 0 | 0 | 0 |
| bypass (146) | 1 | 1 | 1 | 1 |
| rt. shift (160) | 1 | 1 | 1 | 1 |
| $1^{st}$ shift (164) | 0 | 1 | 0 | 1 |
| $2^{nd}$ shift (168) | 0 | 0 | 1 | 1 |

Upon shifting the four bit operand right, shifter/rotator 120 outputs the results on the four least significant output nodes 138.

Shifter/rotator 120 can rotate a four bit operand either left or right by first loading the four bit operand into the four least significant upper and lower input nodes 134 and 136. Thereafter, the four bit operand is rotated left or right by a shift count when the appropriate address signals are provided to the control nodes. Tables 15 and 16 shown below indicate the control signals to be inputted to the various control nodes to achieve left and right rotation of the four bit operand according to the various shift counts.

TABLE 15

| Shift Count | 3 | 2 | 1 | 0 |
|---|---|---|---|---|
| Node |  |  |  |  |
| 8 bit (142) | 0 | 0 | 0 | 0 |
| shift (144) | 1 | 1 | 1 | 1 |
| bypass (146) | 1 | 1 | 1 | 1 |
| rt. shift (160) | 0 | 0 | 0 | 0 |
| 1st shift (164) | 1 | 0 | 1 | 0 |
| 2nd shift (168) | 1 | 1 | 0 | 0 |

TABLE 16

| Shift Count | 3 | 2 | 1 | 0 |
|---|---|---|---|---|
| Node |  |  |  |  |
| 8 bit (142) | 0 | 0 | 0 | 0 |
| shift (144) | 1 | 1 | 1 | 1 |
| bypass (146) | 1 | 1 | 1 | 1 |
| rt. shift (160) | 1 | 1 | 1 | 1 |
| 1st shift (164) | 0 | 1 | 0 | 1 |
| 2nd shift (168) | 0 | 0 | 1 | 1 |

Upon completion of the four bit rotation either left or right, shifter/rotator 120 provides the results at four least significant output nodes 138.

While the present invention has been described with reference to particular embodiments, it will be understood that the embodiments are illustrative and that the invention scope is not so limited. Any variations, modifications, additions and improvements to the embodiment described are possible. These variations, modifications, additions and improvements may fall within the scope of the invention as detailed within the following claims.

What is claimed is:

1. A shifting/rotating circuit, comprising:
   a shifting stage configured to receive and selectively shift an operand, wherein the shifting stage is configured to generate a shifted operand by shifting the operand, and;
   a circuit coupled to first and second control nodes and configured to receive the shifted operand, wherein the circuit operates as a shifter for selectively shifting the shifted operand in response to the first and second control nodes receiving a first shift signal, and wherein the circuit operates to logically OR one set of m consecutive bits of the shifted operand with another set of m consecutive bits of the shifted operand in response to the first and second control nodes receiving an OR signal.

2. The shifting/rotating circuit of claim 1 wherein the circuit comprises m OR gates, and wherein the circuit logically ORs the one set of m consecutive bits of the shifted operand with the another set of m consecutive m bits of the shifted operand using the m OR gates in response to the first and second control nodes receiving the OR signal.

3. The shifting/rotating circuit of claim 1 wherein the one set of m consecutive bits and the another set of m consecutive bits are logically ORed in parallel.

4. The shifting/rotating circuit of claim 1 wherein the one set of m consecutive bits is defined as the m least significant bits of the shifted operand, and the another set of m consecutive bits is defined as the next m least significant bits of the shifted operand.

5. The shifter of claim 1 wherein the one set of m consecutive bits and the another set of m consecutive bits define 2 m consecutive bits of the shifted operand.

6. The shifting/rotating circuit of claim 1 wherein the one set of m consecutive bits is defined as the mn least significant m bits of the shifted operand, and the another set of m consecutive bits is defined as the m most significant bits of the shifted operand.

7. The shifting/rotating circuit of claim 1 wherein the shifting stage is configured to receive the operand in parallel, and the circuit is configured to receive the shifted operand in parallel.

8. The shifting/rotating circuit of claim 1 wherein the circuit further comprises m pairs of AND gates, each AND gate in a pair being coupled respectively to a pair of inputs of an OR gates.

9. The shifting circuit of claim 8 wherein one input of each AND gate is coupled to one of the first and second control nodes.

10. The shifting circuit of claim 9 wherein another input of each AND gate is configured to receive a bit from the shifted operand.

11. The shifting circuit of claim 8 wherein each pair of AND gates is defined to include a first AND gate and a second AND gate, wherein the m first AND gates are coupled to receive the least significant m bits of the shifted operand, and the m second AND gates are coupled to receive the most significant m bits of the shifted operand.

12. The shifting circuit of claim 8 wherein each pair of AND gates is defined to include a first AND gate and a second AND gate, wherein the m first AND gates are coupled to receive the least significant m bits of the shifted operand, and the m second AND gates are coupled to receive the next least significant m bits of the shifted operand.

13. A shifting/rotating circuit, comprising:
a circuit coupled to first and second control nodes and configured to receive an operand, wherein the circuit operates as a shifter for selectively shifting the operand to produce a pre-shifted operand in response to the first and second control nodes receiving a first shift signal, and wherein the circuit operates to logically OR one set of m consecutive bits of the operand with another set of m consecutive m bits of the operand to produce an ORed operand in response to the first and second control nodes receiving an OR signal, and;
a shifting stage configured to receive and selectively shift the pre-shifted operand or the ORed operand, wherein the shifting stage is configured to generate a shifted operand by shifting the pre-shifted operand or the ORed operand.

14. The shifting/rotating circuit o claim 13 wherein the circuit comprises m OR gates, and wherein the circuit logically ORs the one set of m consecutive bits of the operand with the another set of m consecutive m bits of the operand using the m OR gates.

15. The shifting/rotating circuit of claim 13 wherein the one set of m consecutive bits and the another set of m consecutive bits are logically ORed in parallel.

16. The shifting/rotating circuit of claim 13 wherein the one set of m consecutive bits is defined as the m least significant bits of the operand, and the another set of m consecutive bits is defined as the m next least significant bits of the operand.

17. The shifter of claim 13 wherein the one set of m consecutive bits and the another set of m consecutive bits define 2 m consecutive bits of the operand.

18. The shifting/rotating circuit of claim 13 wherein the one set of m consecutive bits is defined as the m least significant m bits of the operand, and the another set of m consecutive bits is defined as the m most significant bits of the operand.

19. The shifting/rotating circuit of claim 13 wherein the circuit further comprises m pairs of AND gates, each AND gate in a pair being coupled respectively to a pair of inputs an OR gate.

20. The shifting circuit of claim 19 wherein one input of each AND gate is coupled to one of the first and second control nodes.

21. The shifting circuit of claim 20 wherein another input of each AND gate is configured to receive a bit from the operand.

22. The shifting circuit of claim 19 wherein each pair of AND gates is defined to include a first AND gate and a second AND gate, wherein the m first AND gates are coupled to receive the m least significant bits of the operand, and the m second AND gates are coupled to receive the m most significant bits of the operand.

23. The shifting circuit of claim 19 wherein each pair of AND gates is defined to include a first AND gate and a second AND gate, wherein the m first AND gates are coupled to receive the m least significant bits of the operand, and the m second AND gates are coupled to receive the m next least significant bits of the operand.

24. A method of rotating an m bit operand, the method comprising the steps:
inputting an x bit operand into a shifter, wherein the x bit operand includes first and second m consecutive bits and first and second n consecutive bits, wherein each of the first and second m consecutive bits define the m bit operand, and wherein each bit of the first and second n consecutive bits define logical zero;
shifting the x bit operand to produce a shifted operand, wherein the shifted operand includes the first m consecutive bits, the first n consecutive bits, and at least one bit from the second m consecutive m bits;
ORing the first m consecutive bits of the shifted operand with m bits of the first n consecutive bits of the shifted operand to produce an m bit ORed operand;
ORing the at least one bit of the shifted operand with one of the n consecutive bits of shifted operand to produce an ORed bit;
concatenating the ORed bit with the m bit ORed operand.

25. A method of rotating an m bit operand comprising the steps:
inputting an x bit operand having first and second m consecutive bits and first and second n consecutive bits, wherein each of the first and second m consecutive m bits represent the m bit operand, and wherein each bit of the first and second n consecutive bits represent logical zero;
ORing the first m consecutive bits with m bits from the first n consecutive bits to produce a first m bit ORed operand;
ORing the second m consecutive bits with m bits from the second n consecutive bits to produce a second m bit ORed operand;
concatenating the first and second m bit ORed operand to produce an ORed operand having at least 2 m bits, and shifting the ORed operand.

* * * * *

UNITED STATES PATENT AND TRADEMARK OFFICE

CERTIFICATE OF CORRECTION

PATENT NO. :   5,991,786

DATED:   November 23, 1999

INVENTOR(S):   Eric W. Mahurin

It is certified that error appears in the above-identified patent and that said Letters Patent is hereby corrected as shown below:

Claim 6, Column 15, line 10, change "mn" to --m--.

Claim 14, Column 15, line 52, change "o" to --of--.

Signed and Sealed this

Twenty-second Day of August, 2000

Attest:

Q. TODD DICKINSON

*Attesting Officer*   *Director of Patents and Trademarks*